United States Patent [19]

Geall et al.

[11] 4,151,159

[45] Apr. 24, 1979

[54] PLASTICS SHAPED ARTICLES

[75] Inventors: Charles L. Geall, Colchester; Leonard Leese; Donald C. Nicholas, both of Manningtree; Gordon C. R. Smith, Colchester; Geoffrey F. Stokes, Dovercourt, all of England

[73] Assignee: Bakelite Xylonite Limited, London, England

[21] Appl. No.: 743,627

[22] Filed: Nov. 22, 1976

Related U.S. Application Data

[63] Continuation of Ser. No. 479,156, Jun. 13, 1974, abandoned.

[30] Foreign Application Priority Data

Jun. 13, 1973 [GB] United Kingdom ............... 28176/73

[51] Int. Cl.$^2$ ......................... B29D 7/24; C08K 3/22; C08K 3/28; C08L 9/00

[52] U.S. Cl. ............................. 260/42.46; 260/42.47; 260/42.52; 260/888; 260/889; 260/892; 264/288; 264/289; 264/DIG. 47

[58] Field of Search ..................... 260/889, 888, 42.46, 260/42.47, 42.52; 264/288, 289, 291

[56] References Cited

U.S. PATENT DOCUMENTS

| | | | |
|---|---|---|---|
| 3,265,769 | 8/1966 | Schaffhausen | 260/889 |
| 3,407,253 | 10/1968 | Yoshimura et al. | 260/889 |
| 3,418,270 | 12/1968 | Traub | 260/42.56 |
| 3,758,661 | 9/1973 | Yamamoto et al. | 260/889 |
| 3,775,521 | 11/1973 | Yamamoto et al. | 264/171 |
| 3,876,735 | 4/1975 | Bontinck et al. | 260/889 |

Primary Examiner—J. Ziegler
Attorney, Agent, or Firm—Brisebois & Kruger

[57] ABSTRACT

A plastics composition comprising an olefin polymer, a styrene or methyl-substituted styrene polymer, a butyl rubber and optionally an ethylene/vinyl polymer, which composition can be stretched to form a paperlike sheet.

10 Claims, No Drawings

PLASTICS SHAPED ARTICLES

This is a continuation of application Ser. No. 479,156, filed June 13, 1974, now abandoned.

This invention relates to the provision of stretched shaped thermoplastics articles, particularly stretched sheet materials made from thermoplastics compositions.

It is known that substitutes for paper may be produced by stretching an article, for example, a sheet, made from a thermoplastics composition which is based on a blend of high-density polyethylene and polystrene. The stretching of such a sheet when conducted under suitably controlled conditions of stretching and temperature can improve such properties as for example, tensile strength and stiffness.

It has been found that the incorporation of quantity of styrene/butadiene rubber in thermoplastics compositions based on blends of high-density polyethylene and polystyrene may lead to an improvement of the surface strength of a stretched sheet made from such a thermoplastics composition. It has, however, been found that such sheets are prone to exhibit "ghosting" when printed in a lithographic press. This phenomenon manifests itself in the lithographic printing on a surface of such sheet after the surface has been in contact with a freshly lithographically-printed surface of a second sheet for example in a stack of printed sheets. The print on the first sheet is found to be patchy because certain areas will not accept the lithographic printing ink. Although various precautions can be taken to minimise, or eliminate, such ghosting, ghosting has constituted a serious handicap to the development of the commercial application of the materials.

This invention is based on the surprising observation that replacement of the styrene/butadiene rubber in these compositions by a butyl rubber results in virtual elimination of this ghosting defect and also results in no detectable loss of surface strength of the stretched sheet made from the new compositions despite the very different natures of the two types of rubber.

The present invention provides a process for the manufacture of stretched shaped articles by first making a shaped article from a thermoplastics composition comprising (a) 100 parts by weight of a high-density polyethylene resin and/or a polypropylene resin (B) 5 to 100 parts by weight of a polymer or copolymer of styrene or a methyl substituted styrene containing at least 50% by weight of styrene and/or methylstyrene, (C) 0.5 to 20 parts by weight of a butyl rubber and (D) 0 to 20 parts by weight of an ethylene/vinyl copolymer, and then uniaxially or biaxially stretching said article at a temperature lying in the range between the crystalline melting point and the glass transition point of the high density polyethylene or polypropylene constituent of the omposition. When component (A) is a high density polyethylene resin the temperature of stretching preferably lies in the range 115° C. to 130° C. and the corresponding range when component (A) is a polypropylene resin is preferably 130° C. to 160° C.

The present invention also provides the compositions from which the shaped articles are made.

As high-density polyethylene resin there may be used homo or copolymers of ethylene having a density lying within the range from 0.94 to 0.97 gm/cc, the copolymers being copolymers of ethylene and other copolymerisable aliphatic hydrocarbon monomers and consisting polymerised ethylene, for example, a 90:10 by weight, copolymer of ethylene and propylene. The high-density polyethylene resins should have a Melt Flow Index (measured according to BS 2782, Part 105C) of from 0.001 to 2.0 and preferably from 0.15 to 0.5 decigram/minute. Mixtures of high-density polyethylenes may be used and, in such mixtures, different components may exhibit an MFI less than 0.001 or greater than 2.0, provided the MFI of the mixture is from 0.001 to 2.0 decigram/minute.

As polypropylene resins there may be used isotactic polypropylene and copolymers of propylene and other copolymerisable monomers, which copolymers consist predominantly of polymerised proplyene, for example, a propylene/ethylene copolymer containing up to 8% by weight of polymerised ethylene. The polypropylene resins generally have a density lying in the range of 0.90 to 0.91 gm/cc. Useful resins exhibit a Melt Flow Index (measured by the procedure of BS 2782 105C, but at a temperature of 230° C.) of from 0.01 to 4.5, preferably from 0.05 to 2.0 decigram/minute. As is the case with high-density polyethylenes, a mixture of polypropylene resins may be employed.

It is also possible to use a mixture of a polyethylene resin and a polypropylene resin.

The glass-transition point (or, as it is also known, the "glass-transition temperature") of a high-density polyethylene or a polypropylene used in this invention can be measured by various well-known means. In cases where the polymer exhibits multiple transitions, the glass transition point for the purposes of this invention is that which has been describes as "Tg (U)" by R. F. Boyer "Plastics & Polymers", p. 15, 1973 (February).

The crystalline melting point of a high-density polyethylene or a polypropylene used in the present invention is herein defined as that temperature above which crystalline regions cannot be recognised: for example, the temperature when spherulites disappear when a sample of the polyolefin is heated while being examined by means of a polarising microscope. Melting points of commercially available polyolefins are found to be of the order of 135° C. and 175° C. for, respectively, high-density polyethylene and polypropylene.

The styrene polymer may be a homopolymer or copolymer of styrene or one of the closely related methyl-substituted styrenes, wherein one or more methyl substituents are present on the aromatic ring, which copolymers may be produced from said styrene or methyl-substituted styrene and a copolymerisable monomer such, for example as butadiene, acrylonitrile, and acrylic and methacrylic esters. Copolymers of styrene and a methyl-substituted styrene, with or without additional comonomers, may also be used. A styrene copolymer may be a graft copolymer derived by polymerising styrene or a methyl styrene in the presence of a rubber such as a butadiene polymer or a styrene/butadiene copolymer rubber. Usable styrene copolymers contain at least 50% by weight of polymerised styrene and/or methyl styrene. It is preferred that the styrene polymer employed should be a homopolymer of styrene having an intrinsic viscosity of at least 0.6 and preferably of from 0.6 to 1.1 measured in toluene at 25° C. The styrene polymer resin can be used in an amount of from 5 to 100 parts by weight per 100 parts by weight of high-density polyethylene and/or polypropylene but amounts of from 30 to 50 parts per 100 parts of high density polyethylene and/or polypropylene are preferred.

The styrene polymers may contain small amounts of lubricants, such as butyl stearate, liquid paraffin and the like.

Butyl rubbers that are advantageously used in the invention are copolymers of isobutylene with 1 to 3% by weight of isoprene. A preferred butyl rubber is Butyl 402, supplied by Polymer Corporation Limited, which is stated to be an isobutylene/isoprene copolymer containing 2.7% by weight of isoprene units. The amount of butyl rubber in the thermoplastics composition used in this invention lies between 0.5 and 20 parts by weight per 100 parts by weight of high density polyethylene and/or polypropylene, but amounts of from 5 to 15 parts butyl rubber are preferred.

Improved products may also be obtained in the process of this invention, particularly when the thermoplastics composition contains dispersed pigment or filler, if an ethylene/vinyl copolymer resin is included, since this assists homogenisation of the composition and aids the dispersion of pigment and/or fillers. The ethylene/vinyl copolymer which comprises component (D) of the composition may be, for example, an ethylene/vinyl acetate copolymer or an ethylene/ethyl acrylate copolymer or an ethylene/acrylic acid copolymer. Especially preferred is ethylene/vinyl acetate copolymer. The ethylene/vinyl copolymers useful in the compositions of this invention are thermoplastic resins which exhibit a Melt Flow Index of from 0.2 to 100, and preferably from 0.2 to 20, decigrams/minute. Resins exhibiting an MFI of from 0.2 to 5.0 are most preferred. The amount of ethylene/vinyl copolymer present in a composition of this invention may be from 0 to 20 parts by weight, preferably 2 to 12 parts by weight, per 100 parts by weight of high-density polyethylene and/or polypropylene.

Thermoplastics compositions useful in this invention can be prepared by any method, or combination of methods, which is suitable for compounding polyolefins used to provide moulded products. The ingredients may, for example, be processed successively by powder mixer, banbury mixer, sheeting mill and calender to provide sheet as a shaped article. Another method involves mixing the ingredients of the blend in a compounding extruder which provides an extrudate which may be in the form of pellets which can be fed to equipment for providing a shaped article in the form of, for example, sheet, tubing, bottles, filaments, injection moulding, etc. Additives such as, for example, pigments, fillers, lubricants, thermal stabilisers, light stabilisers, antioxidants and antistatic agents may be added to the components of the compositions of this invention at suitable stages in their compounding. The nature and quantities of such added materials will depend on the required properties of the end-product. Thus, for example, where stretched sheet is to be used as a substitute for printing paper, pigments and fillers may comprise, for example, titanium dioxide, zinc oxide, calcium carbonate or china clay or mixtures thereof and these can be present in amounts of up to 100, preferably from 5 to 50 parts by weight per 100 parts of high-density polyethylene and/or polypropylene.

The stretching of a shaped article in the process of the present invention may be achieved by any method suitable for uniaxially or biaxially stretching a thermoplastics crystallisable polyolefin. Examples of such methods are: longitudinal or transverse uniaxial stretching of sheet or strip; simultaneous or sequential biaxial stretching of sheet; "bubble-blowing" of tubes; longitudinal stretching of filaments; blowing of bottles and other hollow articles; vacuum or pressure-forming of sheet. The degree of stretching employed in the process of the invention is dependent upon the formulation used to make the shaped article and upon the heat-history to which that article is subjected during the time which elapses between its formulation and the start of its being stretched. It also depends on the properties which are desired in the end-product. Thus, for example, one property of a paper-substitute sheet which is required for a printing process is that it should be flat-lying. This requirement favours the selection of a flat-bed stretching process in which the sheet is run through a flat-bed stretching machine which can stretch the sheet in both the machine and transverse directions either simultaneously or sequentially. As examples of such machines there may be mentioned the machine described in British Patent Specification No. 957 519 and manufactured by Erwin Kampf Maschinenfabrik of Bielstein-Muhlen, W. Germany, and especially the machine described in commonly assigned Patent Application Ser. No. 369609, Nicholas et al., filed June 13, 1973. This latter machine is particularly suitable for stretching the shaped articles in the process of this invention.

Stretch ratios lying within the range of 3:1 to 10:1 may be applied in the machine and transverse directions to sheet made from compositions according to the invention, the preferred ranges being between 3:1 and 4.5:1 for those compositions in which component (A) is high-density polyethylene and between 4:1 and 7:1 for those compositions in which component (A) is polypropylene.

The following Examples illustrate the invention.

EXAMPLE 1

Part A (Comparison)

The following materials were taken in the proportions (by weight) given:

| | |
|---|---|
| High-density polyethylene | 100 |
| Polystyrene | 41.2 |
| Butadiene/styrene copolymer | 7.9 |
| Ethylene/vinyl acetate copolymer | 7.9 |
| Titanium dioxide | 29.5 |
| Calcium carbonate | 9.8 |
| Armourstat 300 antistatic agent | 0.49 |

The high-density polyethylene was Rigidex 2000 (supplied by B. P. Chemical Co.) having a density of 0.95 gms/cc and a melt index of 0.2. The polystyrene was Crystal polystyrene Sternite ST 30 UL (Sterling Moulding Materials Ltd.) having an intrinsic viscosity of 0.75. The butadiene/styrene copolymer was Duradene Rubber (supplied by I.S.R. Co. Ltd.) having the butadiene:styrene in the proportions 75:25. The ethylene/vinyl acetate copolymer was Alkathene EVA copolymer A9839 (supplied by I.C.I. Ltd.) having ethylene:vinyl acetate in the proportions 82:18 and a melt index of 2 decigrams/minute (BS 2782). The titanium dioxide was RCR2 (British Titan Products Ltd.). The calcium carbonate was Calopake F (J & E Sturge Limited). The Armourstat 300 was an amine-type antistatic agent made by Armour Hess Ltd.

The ingredients listed above were compounded in a Banbury mixer to a homogeneous gel which was sheeted out, cooled and diced. The diced material was then fed to a screw-type extruder from which it was extruded as cut pellets which were subsequently fed to a second screw-type extruder fitted with a sheet die-head (maintained at 205° C.) from which sheet was continuously extruded. After leaving this die, the sheet was cooled to a temperature of 100° C. and then at a thickness of 0.064 inch and width 15 inches was passed to a flat-bed stretching machine substantially as described in British Patent Specification No. 957 519 and made by Erwin Kampf Maschinenfabrik of Bielstein-Muhlen, W. Germany, which conveyed the sheet through an air oven having three successive zones of air temperature namely, 160° C., 125° C. and 120° C. The sheet was biaxially stretched as it passed through the second of these zones, a 3.7:1 stretch-ratio being effected in the transverse direction, while simultaneously a 4:1 stretch ratio was effected in the machine direction. After leaving the stretching machine, the sheet was allowed to cool naturally in its passage through the air in the surroundings and was edge-trimmed. After treatment by passage through a corona discharge treatment unit which was adjusted to confer upon the sheet a contact angle with respect to water of below 65° (at 25° C.), the finished sheet was reeled, having a width of 42 inches and a thickness of approximately 0.004 inch. It proved to be flat-lying and could be printed by flexographic, gravure, letter press, off-set lithographic and silk screen methods, but exhibited a tendency to "ghost".

Part B

Part A was repeated except that the formulation was replaced by the following:

|  | Parts by weight |
| --- | --- |
| High-density polyethylene | 100 |
| Polystyrene | 41.2 |
| Butyl 402 rubber | 7.9 |
| Ethylene/vinyl acetate copolymer | 7.9 |
| Titanium dioxide | 29.5 |
| Calcium carbonate | 9.8 |
| Armourstat 300 antistatic agent | 0.49 |

The Butyl 402 rubber was an isobutylene/isoprene copolymer of 97.3:2.7 weight-ratio, and was supplied by Polymer Corporation Ltd. The other ingredients were as specified in Part A.

The 0.004 inch thick sheet produced was found to be similar in physical properties to that made in Part A, printed excellently by the processes named in Part A, but had the distinct advantage of exhibiting no tendency to "ghost".

The sheets from Part A and Part B were each subjected to a surface strength test in which a strip of "Scotch" tape an inch wide is applied to the surface of the sheet using finger pressure. After one minute the tape is stripped off by hand. In this test neither sheet showed surface damage where the tape had been stripped off showing that each sheet had good surface strength.

EXAMPLE 2

Example 1 - Part B was repeated but the stretching machine employed was of the type described in commonly assigned Patent Application Ser. No. 369609, Nicholas et al., filed June 13, 1973. With reference to FIGS. 1 to 9 of that specification and including the preferred features described with reference thereto and which machine comprising pre-heating, stretching and cooling sections was equipped with a two zone circulating air oven system, the two zones corresponding respectively to the pre-heating and stretching sections of the machine. The pre-heating and cooling sections of the machine were such that the grippers on each side of the machine were arranged to run substantially parallel to one another. The stretching section of the machine was arranged to effect a simultaneous biaxial stretch comprising 4:1 in both the longitudinal and transverse directions, the rate of stretching in both directions being arranged to be substantially uniform over the whole section. The lengths of the pre-heating, stretching and cooling sections were approximately 9 feet, 6 feet and 19 feet respectively. The oven system was provided with heaters, fans and baffles to aid control of the temperature of the air circulating immediately above and immediately below the sheet. It was arranged that the temperatures of the air in the zones were:

|  | Zone 1 | Zone 2 |
| --- | --- | --- |
| Above the sheet | 145° C. | 122° C. |
| Below the sheet | 148° C. | 125° C. |

The sheet temperature was about 126° C. in Zone 2 while being stretched.

The sheet, gripped at its edges by the web gripping devices at a temperature of about 126° C. and at a pitch of 1.5 inches on entering the pre-heating section was carried through the three sections of the machine. On emerging from the stretching section, the sheet was conveyed through the cooling section where it was cooled by convection and was then released by the grippers and edge-trimmed. The sheet was then passed through an electrical corona discharge treatment unit which was adjusted to give a treatment level such that the contact angle of the finished sheet with respect to water was less than 65° (at 25° C.). The finished sheet of approximate thickness 0.004 inch and width 42 inches was reeled at a rate of 20 feet/minute. The sheet was flat-lying and could be printed excellently by the processes named in Example 1 Part A but had the distinct advantage of exhibiting no tendency to "ghosting" when employing the lithographic process.

EXAMPLE 3

Example 2 was repeated except that the formulation was replaced by the following:

|  | Parts by weight |
| --- | --- |
| High density polyethylene | 100 |
| Polystyrene | 26.4 |
| Butyl 402 rubber | 7.0 |
| Ethylene/vinyl acetate copolymer | 7.0 |
| Titanium dioxide | 21.0 |
| Calcium Carbonate | 14.0 |
| Armourstat 300 antistatic agent | 0.53 |

The details of the above ingredients were as specified in Example 1.

The sheet produced was flat-lying and could be printed excellently by the processes named in Example 1 Part A but again had the advantage of exhibiting no tendency to "ghosting" when employing the lithographic process.

We claim:

1. A plastics composition comprising:
   (a) 100 parts by weight of an olefin polymer selected from high density ethylene polymers, propylene polymers and mixtures thereof;

(b) 5 to 100 parts by weight of a non-rubbery styrene polymer selected from styrene homopolymers, styrene copolymers containing at least 50% by weight of styrene, methyl substituted styrene homopolymers, methyl substituted styrene copolymers containing at least 50% by weight of methyl styrene, copolymers of styrene and a methyl substituted styrene and mixtures thereof per hundred parts by weight of polymer (a);

(c) 0.5 to 20 parts by weight of a copolymer of isobutylene with 1 to 3% by weight of isoprene per hundred parts by weight of polymer (a);

(d) 2 to 12 parts by weight of an ethylene/vinyl copolymer per hundred parts by weight of polymer (a); and, (e) a compound selected from the group consisting of a filler, a pigment and mixtures thereof per hundred parts by weight of polymer (a).

2. The composition of claim 1, wherein component (b) is a styrene homopolymer having an intrinsic viscosity of at least 0.6.

3. The composition of claim 2, wherein component (b) is a styrene homopolymer having an intrinsic viscosity of from 0.6 to 1.1.

4. The composition of claim 1, wherein component (b) is present in an amount of from 30 to 50 parts by weight per hundred parts by weight of component (a).

5. The composition of claim 1, wherein component (c) is present in an amount of from 5 to 15 parts by weight per 100 parts by weight of component (a).

6. The compositions of claim 1, wherein component (d) is selected from the group consisting of ethylene/vinyl acetate copolymers, ethylene/ethylacrylate copolymers and ethylene/acrylic acid copolymers.

7. The composition of claim 1, wherein said filler and pigment is present in an amount of up to 100 parts by weight per 100 parts by weight of component (a).

8. The composition of claim 1, wherein said filler and pigment is present in an amount of from 5 to 50 parts by weight per 100 parts by weight of component (a).

9. A stretched article made from a composition as claimed in claim 1.

10. A paper substitute made by stretching a composition as claimed in claim 1.

* * * * *